Inventor
Royden C. Sanders, Jr.
By
Attorney

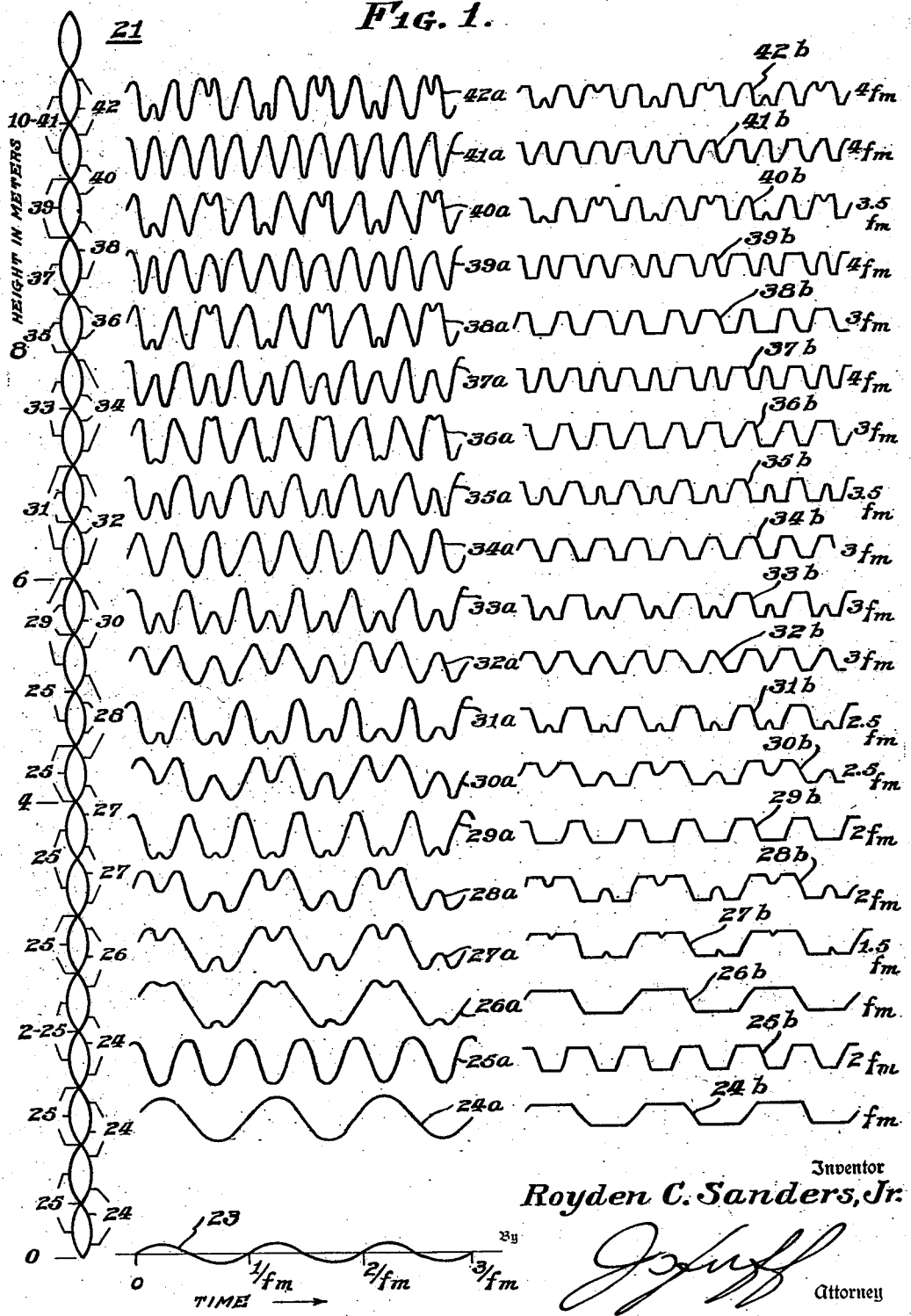

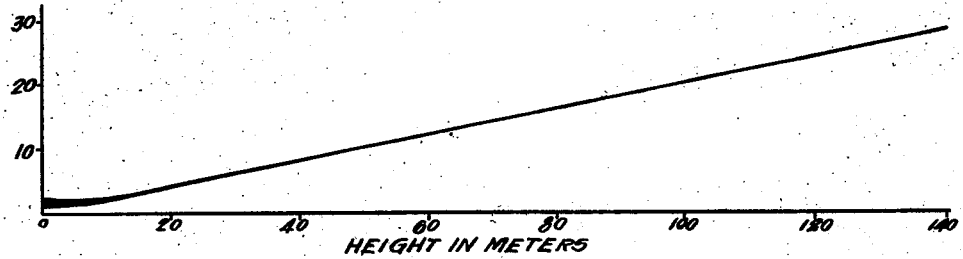
Fig. 4.
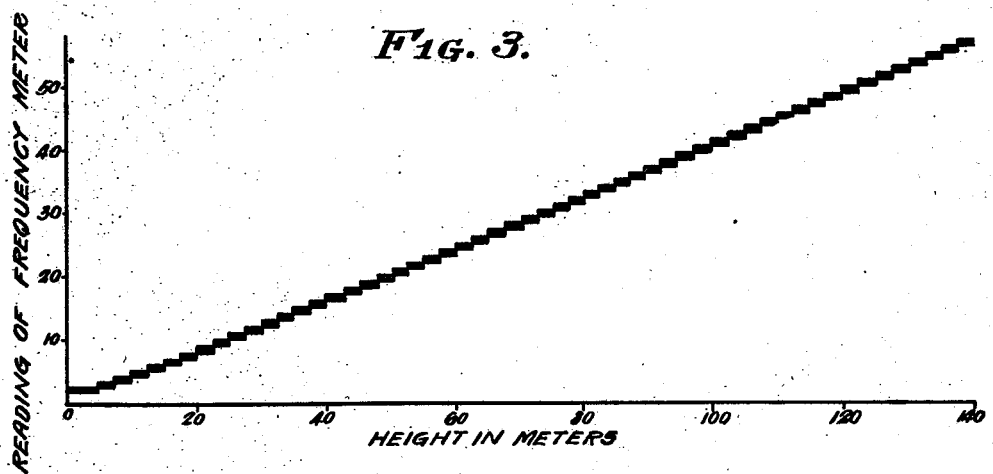
Fig. 3.
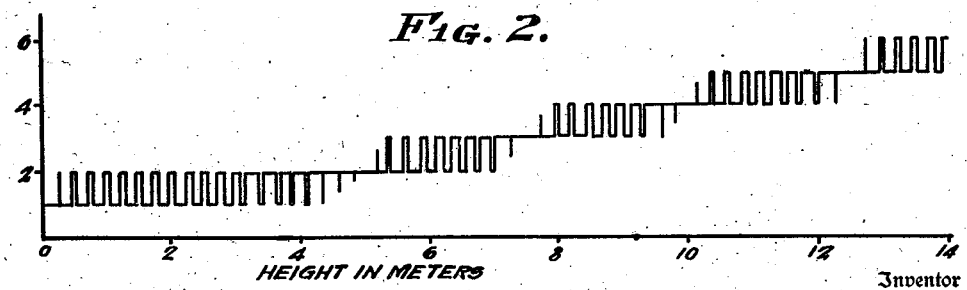
Fig. 2.
Inventor
Royden C. Sanders, Jr.
By
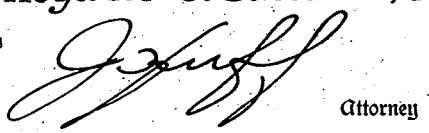
Attorney

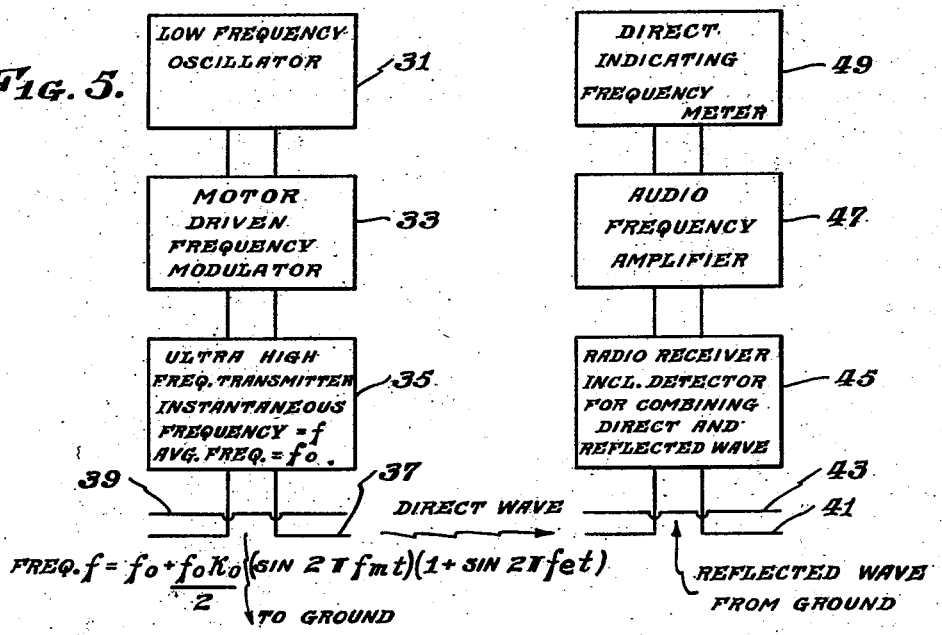
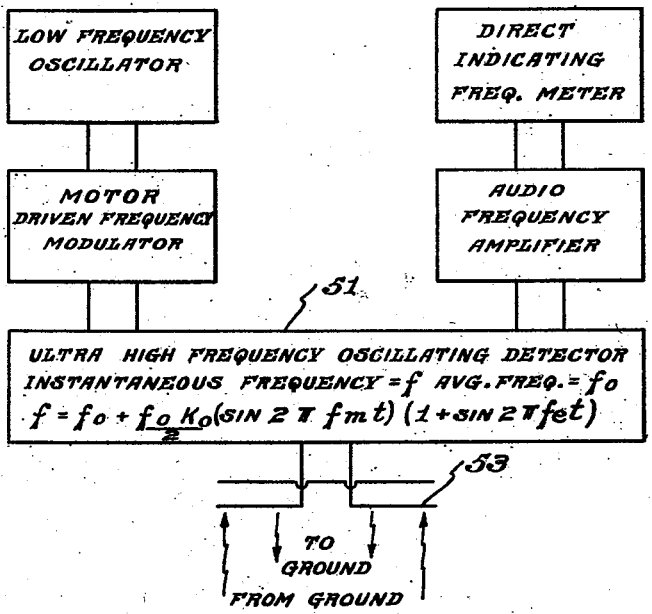

Patented Nov. 19, 1940

2,222,586

UNITED STATES PATENT OFFICE 2,222,586

RADIO ALTIMETER

Royden C. Sanders, Jr., Audubon, N. J., assignor to Radio Corporation of America, a corporation of Delaware Application January 28, 1939, Serial No. 253,280

11 Claims. (Cl. 250—1)

This invention relates to altimeters and, more especially, to an altimeter in which frequency modulated radio waves are transmitted from a point in space toward a wave reflecting object and back to the point to indicate the altitude as a function of frequency. I am aware of the work which has been done by Bentley (U. S. Patent 2,011,392) and Espenschied (U. S. Patent 2,045,071) in altitude-measuring devices in which frequency modulation is employed. In the practical adaptation of these altimeters, a direct-reading frequency meter is employed. It is usual to use an electron-counter type of meter. Such meters indicate the number of times the current reverses within predetermined amplitude limits, and therefore can indicate only in multiples of such numbers. When a frequency type altimeter of the type described in the above-mentioned patents is used with a frequency meter, certain errors are inherent in the system. These errors will be more fully described hereinafter.

If a radio altimeter is employed in which the band of frequency modulation is varied rather than maintained constant, it can be shown that the errors are greatly reduced. In some instances, the errors will be relatively unimportant. This will be true when the instrument is used on an aircraft flying several thousand feet above the nearest object. The errors may become of great importance as the aircraft is about to land. It is, therefore, one of the objects of the invention to provide means for indicating altitude. It is another object to provide means in a radio frequency type altimeter for modulating through a variable band width whereby the errors are substantially reduced. It is a further object of the invention to provide a simple, inexpensive means for modulating through a variable band of frequency in contrast to the conventional constant band width modulation.

Figure 7:
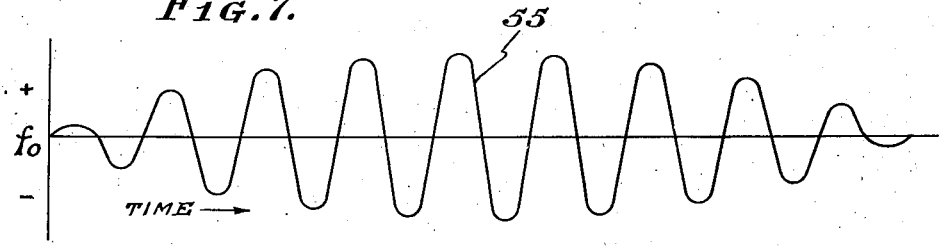
Figure 8:
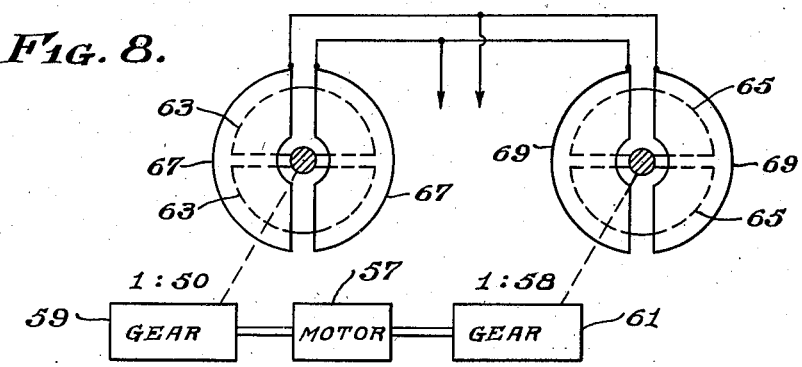
Figure 9:
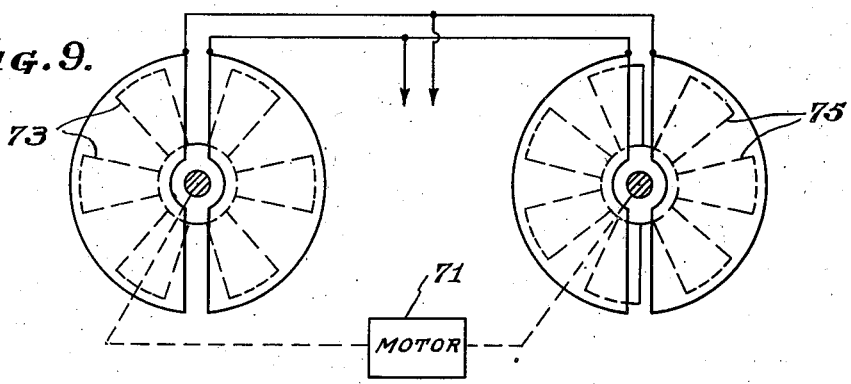
Figure 10:
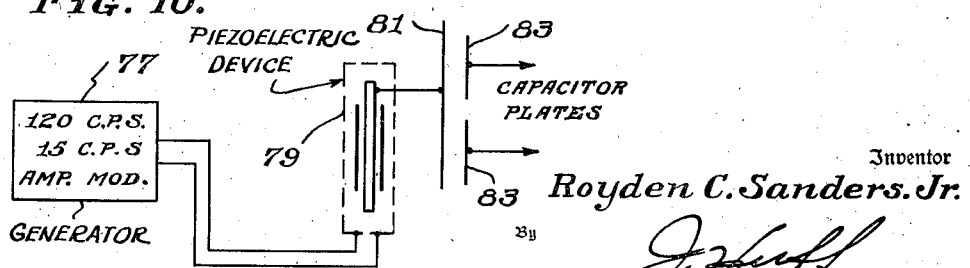

The invention will be described by reference to the accompanying drawings, in which Figures 1, 2, 3 and 4 are graphs indicating the operation of constant and variable band width frequency modulated altimeters. Figures 5 and 6 are schematic circuit diagrams illustrating the system. Figure 7 is a graph illustrating the nature of the variable band width modulation. Figures 8 and 9 are schematic circuit diagrams of the frequency modulators employed in the invention, and Figure 10 is a modification of the frequency modulator.

Referring to Figure 1, if a radio transmitter or altimeter is operating at a wave length of, say, one meter and at an altitude of 11 meters above a reflecting medium, standing waves will be created which may be represented as shown by the pattern 21. As the frequency is changed, the standing wave pattern is changed. Since it is difficult and confusing to attempt to graphically illustrate the changes in the standing wave pattern, it will be assumed, for explanatory purposes, that the altimeter is raised and lowered with respect to the reflecting surface and that the standing wave pattern remains constant. This is the full equivalent of changing the pattern and keeping the altitude of the altimeter constant. In the actual altimeter operating at a given height the frequency is slowly varied, say, five per cent above and below the average frequency, as indicated by the curve 23. However, moving an altimeter in which no frequency modulation is employed up and down on the standing wave pattern five percent above and below the given height at the same variation frequency and making it responsive as a function of the width of the curve 21, will produce an audio voltage similar to the voltage which would be generated in the receiver, had the transmitter frequency been thus varied. Such voltages are represented by the curves 24a to 42a. If the altimeter is at any of the lines 24, the voltage will be represented as curve 24a. If the altimeter is at any of the lines 25, the voltage will be represented as curve 25a. If the altimeter is at any of the lines 26, the voltage will be represented as curve 26a. In similar manner the altimeter may be assumed to be at any height and the corresponding voltage indicated by the curves. The voltage represented by the curves 24a, 25a, 26a, etc. after limitation is represented by the respective curves 24b, 25b, 26b, etc. In the last mentioned curves the frequency indicated by the frequency meter of the type described, is $f_m$, $2f_m$, $3f_m$, etc. respectively as indicated. It should be understood that the positions of the curves 25a, 26a, 27a, 25b, 26b, 27b, etc. and their amplitudes on the chart (Fig. 1) have no definite relation to the altitude. It is the reading of the frequency meter as indicated to the right of the curves 25b, 26b, 27 that is the important practical element and not any definition of the frequency of the curves 25a, 26a, etc. It will be seen that the indicated altitude is subject to considerable error which is due to the fact that the frequency indicator indicates only as a function of the constant band modulation frequency.

It may be somewhat difficult to visualize the erroneous indications which may be obtained in an altimeter of the foregoing type. In order that the indications may be shown in different form, a chart (Fig. 2) has been prepared. The points on this chart correspond to the altitude lines 24, 25, etc. indicated in Fig. 1 but extends the altitude to 14 meters instead of 11. It will be seen that the indicated height of the altimeter, for an actual altitude from 0 to slightly over 5 meters, varies in erratic fashion. While the actual height may be of the order of 4 meters, the reading of the frequency meter may be either 2 meters or 1 meter, as the case may be. A reason for this variation, as mentioned above, is because the frequency meter responds as a function of multiples of the modulation frequency.

While the chart of Fig. 2 has been prepared to indicate the variations over a range from 0 to 14 meters, it should be understood that the erroneous indications continue as the altitude is increased. This increase has been shown in Fig. 3. The series of blocks indicate the limits of readings in terms of the actual height. The accuracy of these prior art altimeters may be improved by using a wider band width through which the frequency is varied. However, this is not desirable because of practical difficulties as well as obvious limitations of available channels and interference. While the foregoing arrangements are characteristic of a constant frequency band width, I have found that the errors may be substantially eliminated at all altitudes in excess of 10 or 20 meters, provided a variable band width modulator is used. Furthermore, the variable band width does not increase the required frequency channel for an improved accuracy. The resultant altimeter characteristic is shown in Fig. 4.

The foregoing analysis is not based entirely on mere theory but is sustained by experimental evidence which has been obtained by the operation of the systems on a pair of Leecher wires. In the experiment, both constant band modulation and variable band modulation were employed and the actual measurements corresponding to Fig. 1 through 4 were made.

Referring to Fig. 5, the practical system may be represented as a low frequency oscillator 31, which is connected to a synchronously driven modulator 33, which is in turn connected to a high frequency transmitter 35. The output of the transmitter is applied to a dipole antenna 37 which may include a reflector 39. The receiving device consists of a receiving antenna 41, a reflector 43, and a radio receiver 45. The output of the radio receiver is connected to an audio frequency amplifier 47. The output of the audio amplifier is applied to a direct indicating frequency meter 49. The frequency meter may be of the type indicated in the copending application Serial No. 248,577, filed December 30, 1938, and entitled Frequency Meter.

In the operation of this system, currents from the low frequency oscillator are applied to the variable band frequency modulator which will be hereinafter described. The frequency modulator varies the frequency of the radiating wave generated by the transmitter 35 so that the frequency $f$ may be represented by the equation $$f = f_0 + \frac{f_0 k_0}{2}(\sin 2\pi f_m t)(1 + \sin 2\pi f_e t)$$

in which the symbol $f_0$ stands for the average frequency of the transmitter, and $f_e$ = low frequency at which band width is varied. Radio waves are radiated from the transmitting antenna 37 toward the ground and there reflected to the receiver which is located adjacent the transmitter. The reflected waves reach the receiver where they are combined with the direct wave to produce an audio beat note which is amplified and its frequency indicated by the direct reading frequency meter.

Since the arrangement of Fig. 6 is substantially the same as Fig. 5, it is unnecessary to repeat the description. It is sufficient to note that an oscillating detector 51 is used for transmitting as well as receiving. The oscillating detector is connected to a common antenna 53. This system, insofar as the fundamentals are concerned, is similar to that described in Espenschied U. S. Patent No. 2,045,071. It differs from the device described in Espenschied U. S. Patent No. 2,045,071 in that the transmitter is modulated over a variable band width instead of over a constant band width.

The nature of the variable band width modulation is represented by the graph of Fig. 7. In this representation, the frequency is varied different amounts over the same periods of time, as indicated by the curve 55. One means for producing this type of modulation is illustrated in Fig. 8. In this arrangement, a common motor 57, having a velocity of the order of one revolution per second and operating through gears 59, 61 which may have a ratio, by way of example, of 1 to 50 and 1 to 58, drives rotors 63, 65. These rotors are comprised of a pair of substantially semicircular blades, which are insulated from their shafts and from pairs of stator plates 67, 69. The several stator plates are connected in parallel pairs. Since the capacities are varied in synchronism but at different rates, the resultant variation of capacity will cover not a constant band but a variable band. This variation in capacity modulates the transmitter, as previously indicated.

Since it may be desirable to avoid the use of gears, it should be understood that two motors operating at different velocities (such as 50 R. P. S. and 58 R. P. S.) may be employed or, as shown in Fig. 9, a single motor 71 may be used to drive rotors 73, 75, which have a different number of blades.

In some installations, rotating parts may be considered undesirable. In such event, I have shown an arrangement in Fig. 10 in which a generator 77 of currents having a frequency of the order of 120 cycles per second is amplitude-modulated by a second generator at a frequency of 15 cycles per second. The resultant amplitude-modulated currents are applied to a piezoelectric device 79, which is connected to a movable capacitor plate 81. The movable capacitor plate is vibrated back and forth with respect to a pair of fixed capacitor plates 83. It should be understood that other devices, such as electronic oscillators, may be used to provide variable band width modulation.

Thus, the invention has been described as an altimeter of the radio-wave type, in which the frequency is shifted over a variable band in contrast to the fixed band width systems of the prior art. The variable band width system averages out the erroneous indications which are obtained by the prior art radio altimeters. It should be understood that the examples of band widths have been given more by way of illustration than limitation. While the device has been described as an altimeter, it should be understood that it may be employed for obstacle detection.

I claim as my invention:

1. The method of determining altitude which includes generating oscillatory currents, varying the frequency of said currents over variable bands of frequencies, applying said currents of variable bands of frequencies to a radiator to establish waves from the point of unknown altitude to the earth to be reflected therefrom, combining the radiated waves and the reflected waves, and demodulating the resultant waves.

2. The method of measuring distance from a point to a wave reflecting medium which includes generating radio frequency currents, varying the frequency of said currents over variable bands of frequencies, applying said currents of variable bands of frequencies to a radiator to establish waves from said point to said medium, combining the radiated waves and the reflected waves, and demodulating the resultant waves.

3. The method of measuring distance from a point to a wave reflecting medium which includes generating oscillatory currents, varying the frequency of said currents over variable bands of frequencies, applying said currents of variable bands of frequencies to a radiator to establish waves from said point to said medium, combining the radiated waves and the reflected waves, demodulating the resultant waves, and indicating the distance of said medium as a function of the frequency of said resultant waves.

4. The method of determining altitude which includes generating radio frequency currents, varying the frequency of said currents a predetermined amount about a mean frequency, altering continuously the amount of said frequency variation to affect variable band frequency modulation, applying the thus continuously modulated currents to a radiator to establish waves from the point of unknown altitude to the earth, combining the radiated waves and waves reflected by the earth, and demodulating the resultant waves.

5. The method of determining altitude which includes generating oscillatory currents, varying the frequency of said currents over variable bands of frequencies, applying said currents of variable bands of frequencies to a radiator to establish waves from a position of unknown altitudes to the earth to be reflected therefrom, combining the radiated waves and the reflected waves, demodulating the resultant waves, and limiting said resultant waves.

6. The method of determining altitude which includes generating radio frequency currents, varying the frequency of said currents over variable bands of frequencies, applying said currents of variable bands of requencies to a radiator to establish waves from a position of unknown altitude to the earth to be reflected therefrom, combining the radiated waves and the reflected waves, demodulating the resultant waves, limiting said resultant waves, and observing the number of times the resultant limited waves change direction whereby the altitude may be determined.

7. In a distance measuring device of the character described, a source of oscillatory currents, means for varying the frequency of said currents, means for varying continuously the range of variation of said last mentioned means, means for applying the thus varied currents to an antenna to radiate waves from the point from which distance is to be measured towards a wave reflecting medium, means for receiving at said point the reflected waves and the radiated waves, means for combining said waves, and means for demodulating said combined waves.

8. In a distance measuring device of the character described, a source of oscillatory currents, a modulator for varying continuously both the frequency and the range of said variation of said currents, means for applying the thus modulated currents to an antenna to radiate waves from the point from which distance is to be measured towards a wave reflecting medium, means for receiving at said point the reflected waves and the radiated waves, means for combining said waves, means for demodulating said combined waves, means for limiting said demodulated waves, and means for observing the number of times the limited waves change direction, whereby the distance to the reflecting medium may be measured.

9. An altimeter including means for establishing waves, means for varying the frequency of said waves about their mean frequency by varying amounts so that variable band widths are covered, means for radiating said waves from a position whose altitude is to be determined toward the earth to be reflected therefrom, means for combining the radiated waves and the reflected waves, and means for demodulating the resultant waves.

10. An altimeter including means for establishing radio frequency waves, means for varying the frequency of said waves about their mean frequency by varying amounts so that variable band widths are covered, means for radiating said waves from a position whose altitude is to be determined toward the earth to be reflected therefrom, means for combining the radiated waves and the reflected waves, means for demodulating the resultant waves, and means for measuring the frequency of the demodulated waves.

11. An altimeter including means for establishing radio frequency waves, means for varying the frequency of said waves about their mean frequency by varying amounts so that variable band widths are covered, means for radiating said waves from a position whose altitude is to be determined toward the earth to be reflected therefrom, means for combining the radiated waves and the reflected waves, means for demodulating the resultant waves, means for limiting the amplitude of the resultant waves, and means for measuring the number of times the limited waves change direction, whereby altitude is indicated.

ROYDEN C. SANDERS, JR.